United States Patent [19]
Victora et al.

[11] Patent Number: 5,457,582
[45] Date of Patent: Oct. 10, 1995

[54] MAGNETO-OPTICAL STORAGE MEDIUM WHEREIN HEATING A PORTION OF A READ LAYER CHANGES THE PORTION'S MAGNETIC ORIENTATION

[75] Inventors: Randall H Victora, Rochester; Tukaram K. Hatwar, Penfield, both of N.Y.

[73] Assignee: Eastman Kodak Company, Rochester, N.Y.

[21] Appl. No.: 348,679

[22] Filed: Dec. 2, 1994

Related U.S. Application Data

[63] Continuation of Ser. No. 790,911, Nov. 13, 1991, abandoned.

[51] Int. Cl.⁶ .................................................. G11B 13/04
[52] U.S. Cl. ............................ 360/59; 369/13; 365/122
[58] Field of Search .......................... 360/59, 114, 66, 360/103; 369/13, 110; 365/122

[56] References Cited

U.S. PATENT DOCUMENTS

| | | | |
|---|---|---|---|
| 4,340,914 | 7/1982 | Hanaoka | 360/59 |
| 4,628,485 | 12/1986 | Tanaka et al. | 365/122 |
| 4,794,560 | 12/1988 | Bell et al. | 365/122 |
| 4,853,912 | 8/1989 | Akasaka et al. | 369/73 |
| 4,888,750 | 12/1989 | Kryder et al. | 369/13 |
| 4,932,012 | 6/1990 | Kobayashi | 360/114 |
| 5,051,970 | 9/1991 | Ishii et al. | 369/13 |

FOREIGN PATENT DOCUMENTS

| | | | |
|---|---|---|---|
| 60-119648 | 6/1985 | Japan | 369/13 |
| 60-119649 | 6/1985 | Japan | 369/13 |
| 62-1554347 | 12/1985 | Japan | |

OTHER PUBLICATIONS

Japanese Journal of Applied Physics vol. 28, No. 11, Nov. 1989, pp. 1973–1976 H.A.M. van den Berg.
J. Appl. Phys. 63(8), Apr. 15, 1988, pp. 3844–3846 M.D. Schultz, H—P. D. Shieh, and M. H. Kryder.

*Primary Examiner*—Hoa T. Nguyen
*Attorney, Agent, or Firm*—Raymond L. Owens

[57] ABSTRACT

The present invention pertains to a storage medium for use in a magneto-optical storage system. The storage medium comprises two layers of magnetic material, a storage layer and a read layer. The magnetic material of the storage layer has perpendicular (or vertical) axis of orientation; and within the storage layer the direction of magnetic orientation is either parallel or anti-parallel (up or down) relative to the direction of an impinging read radiation beam. In this storage system, the direction of orientation of magnetic material in one direction represents a first logical state, and a direction of orientation in the opposite direction represents a second logical state. The direction of orientation is thus a function of stored data. The read layer has parallel magnetic orientation and a transition temperature above the operating temperature but below the read temperature such that the axis of orientation of the magnetic material and the direction of orientation of the read layer during readout is the same as the corresponding portion of the storage layer.

9 Claims, 3 Drawing Sheets

MAGNETO-OPTICAL STORAGE MEDIUM WHEREIN HEATING A PORTION OF A READ LAYER CHANGES THE PORTION'S MAGNETIC ORIENTATION

This is a Continuation of application Ser. No. U.S. 790,911, filed 13 Nov. 1991, now abandoned.

BACKGROUND OF THE INVENTION

1. Field of Invention

This invention relates generally to optical information storage systems for the storage and retrieval of information and, more particularly, to an information storage medium for use in an optical storage system making use of magneto-optical materials for the storage of information.

2. Description of the Related Art

The optical information storage systems generally referred to as magneto-optical storage systems, are of particular interest because of the ability to alter or over-write information already stored on the medium. In these systems, a magnetic medium exhibiting the Kerr effect is used to store information. The Kerr effect provides that magnetic materials having a component of magnetic orientation parallel to a direction of impinging radiation will affect the (linear) polarization of reflected radiation depending upon whether the magnetic orientation is parallel or anti-parallel to the direction of impinging radiation. Although the difference in the rotation of the plane of polarization is typically less than 2°, this difference has been found to be sufficient to provide a basis for an optical storage system. In this storage system, the orientation of magnetic material in one direction represents a first logical state while the orientation in the opposite direction represents a second logical state.

The materials used in the magneto-optical storage systems are typically rare earth/transition metal alloy thin films. Examples of the materials currently used in the magneto-optical storage systems include Gadolinium-Cobalt thin films, Gadolinium-Iron thin films, Terbium-Iron thin films, Dysprosium-Iron thin films, etc. The magneto-optical storage systems have several complexities in implementation, such as the requirement for an external field during the storage medium write cycle, which has been the subject of extensive development activity. By way of specific example, U.S. Pat. No. 4,853,912, issued to Akasaka et al., discloses the positioning of a magnetic material along the sides of the information paths or tracks. This provides the bias field. U.S. Pat. No. 4,794,560 issued to Bell et al. and Japanese Patent 62-154347 issued to Horigome, are examples of storage media in which a plurality of layers of magnetic material are used to provide bias conditions. U.S. Pat. No. 4,628,485 issued to Tanaka et al. describes a method of improving the Kerr rotation. These patents are indicative of efforts to provide a more convenient write storage medium.

While the effort to develop a convenient storage material for writing or overwriting of information has received the principal attention, a continuing concern in the magneto-optical recording systems is the limitation on the density of information that can be effectively read by the system. In particular, the limitation on the storage density is typically a result of the size of the radiation beam applied to the surface of the magneto-optical storage medium. In the article by Aratani et al. entitled "Magnetically Induced Super Resolution In Novel Magneto-Optic Disk", S.P.I.E. Proceedings, vol. 1499. page 209 (1991), a system for providing an optical storage medium capable of storing a higher density of information is disclosed. However, the disclosed system requires an initializing field.

A need has been felt for materials and an associated technique for reading information in a magneto-optical storage system which is not density-limited by the size of the area of illumination of the radiation in reading the stored information and which does not require a initialization field for the reading operation.

SUMMARY OF THE INVENTION

The present invention is directed to overcoming one or more of the problems set forth above. Briefly summarized, according to one aspect of the present invention, the storage medium is comprised of two layers of magnetic material, a storage layer and a reading layer. The storage layer possesses perpendicular anisotropy wherein magnetizations in this layer are oriented perpendicular to the surface of the storage medium. The perpendicular magnetic orientation is retained at temperatures well above the temperatures present during the read operation. The reading layer is a magnetic material positioned between the storage medium and the impinging radiation. At ambient temperatures present before the read operation, the axis of orientation of the magnetic field is parallel to the surface of the storage medium. A requirement on the reading layer material is that the magnitude of the anisotropy energy associated with maintaining the horizontal orientation decrease relatively rapidly above the ambient operating temperature, even to the extent that a perpendicular orientation of the magnetic domains of the reading layer is preferred at temperatures above the ambient temperature. This magnetic behavior of the reading layer permits the interaction with the vertically oriented magnetic domains of the storage layer to impose a vertical magnetic orientation for proximate domains of the reading layer. The temperature at which the magnetic domains of the reading layer become vertically oriented (or ordered) is referred to as the transition temperature.

When the read radiation beam is scanning the storage material, the intensity of the radiation is such that radiation heating of the reading layer causes a localized region of the reading layer to be heated above the transition temperature. Above the transition temperature, the interaction with the storage layer results in the orientation of the localized reading layer region in the direction of the orientation of the adjacent storage layer. The intensity of radiation of the impinging radiation beam is selected such that only a portion of the reading layer region irradiated by the beam reaches a temperature above the transition temperature of the reading layer and that reading layer portion is above the transition temperature of the reading layer for a relatively short period of time.

These and other aspects, objects, features and advantages of the present invention will be more clearly understood and appreciated from a review of the following detailed description of the preferred embodiments and appended claims, and be reference to the accompanying drawings.

DESCRIPTION OF THE PREFERRED EMBODIMENTS

1. Detailed Description of the Figures

Figure 1:
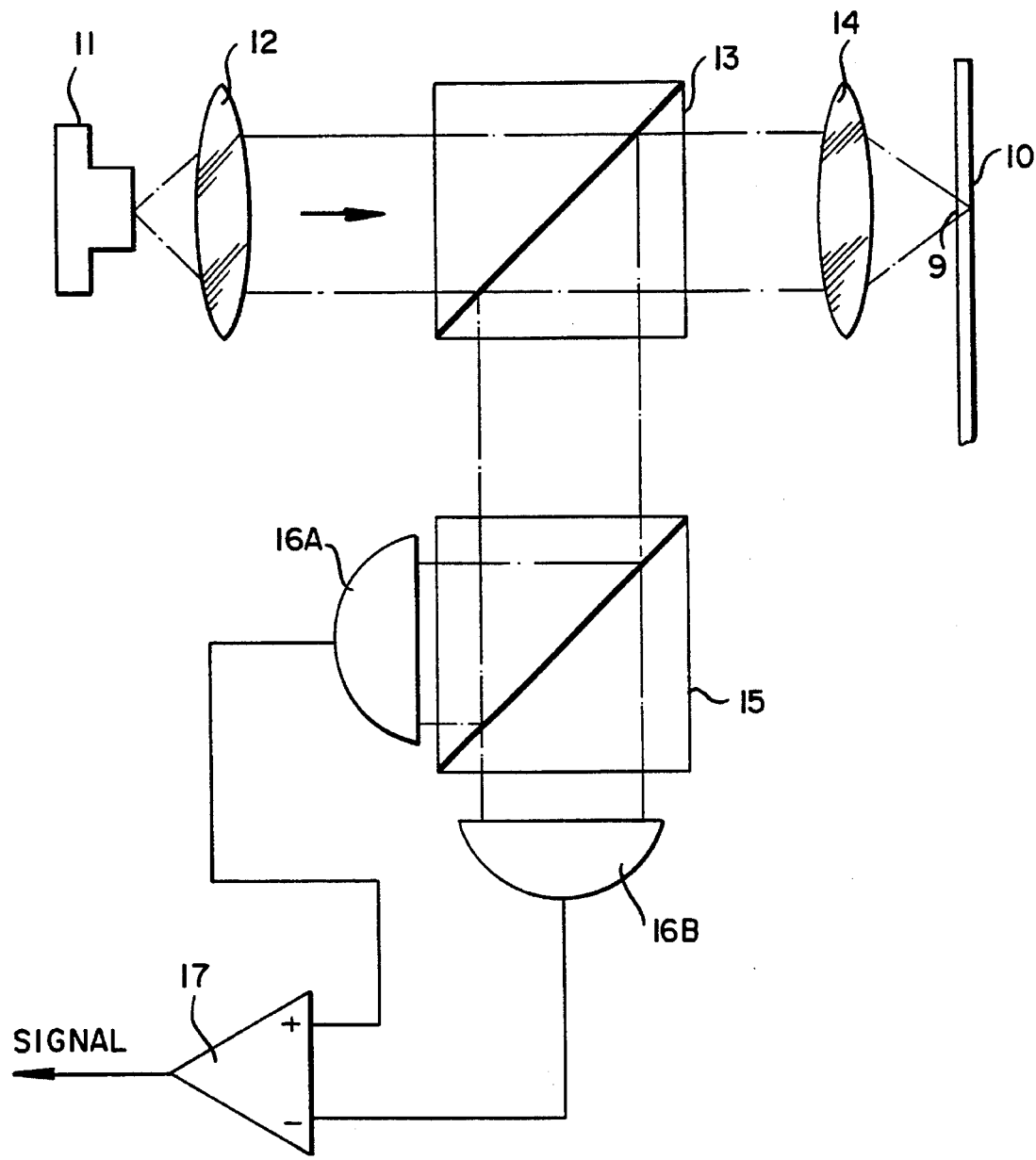
FIG. 1 is a block diagram of the elements of a magneto-optical information storage system including the relationship of the storage medium to the read radiation beam.

Referring to FIG. 1, the relationship of the important elements of apparatus for reading a magneto-optical information storage media are illustrated. A radiation source 11, typically a laser diode, is positioned to illuminate a collimating lens 12 and provide a collimated radiation beam. The collimated radiation beam is transmitted through a partial polarization beam splitter 13 and the resulting plane polarized radiation is applied to objective lens 14. The lens 14 focuses the radiation on the surface of information storage medium 10 to form an area 9 of illumination on the surface of the storage medium. The reflected radiation from the storage medium is recollimated by passage through the objective lens 14 and applied to partial polarization beam splitter 13. The portions of the reflected radiation beam affected by the storage medium 10 are reflected by the partial polarization beam splitter 13 and applied to polarization beam splitter 15. The radiation applied to polarization beam splitter 15 is detected by radiation detectors 16A and 16B. The output signals from radiation detectors 16A and 16B are processed by signal processing network 17, e.g., a differential amplifier. In addition, radiation detectors and apparatus (not shown) are provided to continuously position objective lens 14 relative to the storage medium 10 and maintain the radiation focussed on the storage medium. Typically the storage medium 10 is in motion relative to the area 9 of illumination and the position of the lens 14 must be continuously adjusted.

Figure 2:
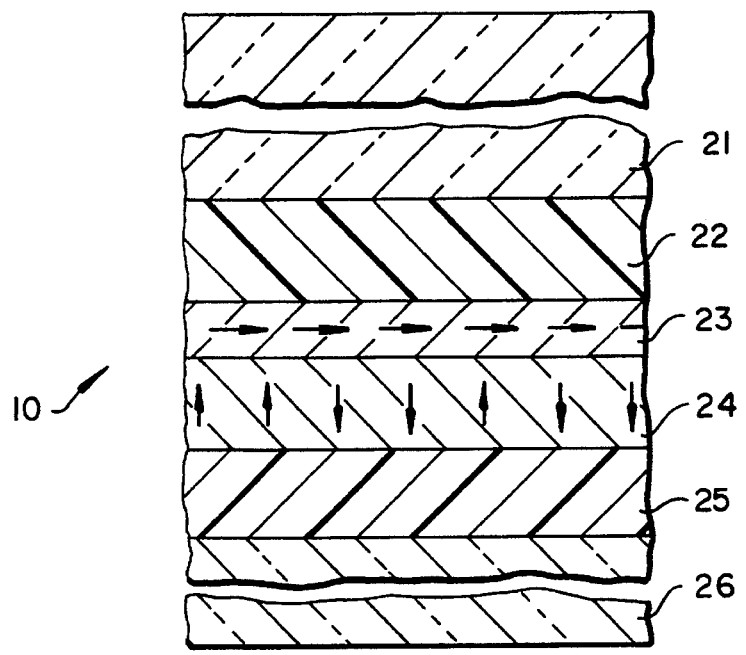
FIG. 2 is an expanded cross sectional diagram of the storage medium according to the present invention.

Referring next to FIG. 2, a detailed diagram of a cross section of the storage medium, according to the present invention, is shown. In the preferred embodiment, the storage medium 10 is generally configured as a disk. The storage medium 10, on the surface layer closest to the radiation source 11, has a transparent substrate (and support) layer 21, typically fabricated from polycarbonate, to provide support for the other layers. A dielectric layer 22, which for example can be fabricated from aluminum nitride enhances the signal to noise ratio exhibited by the Kerr rotation. The dielectric layer 22 can minimize the reflection that would otherwise be found at the inner boundary of the transparent layer 21. Read layer 23 is a magnetic material in which the domains are ordered spontaneously below the transition temperature so as to be parallel to the surface of the storage medium as shown by the arrows in region 23, i.e., generally perpendicular to the impinging radiation. Storage layer 24 is a layer of magnetic material which is ordered spontaneously below the material Curie temperature in a direction generally parallel to the impinging radiation as shown by the arrows in region 24. For reasons which become clear, the transition temperature of the read layer 23 is chosen to be achievable by a laser operating in a read mode. Next to storage layer 24 is a second dielectric layer 25, which for example can be fabricated from aluminum nitride and which protects the storage layer 24 from physical compromise. Finally, the protective layer 26 is typically a lacquer material. As will be clear to those skilled in the art, the cross sectional view shown in FIG. 2 is not to scale. By way of illustrative example, the read layer 23 can be a thin film layer having a thickness of 200–1000 Å, the storage layer 24 can be a thin film layer having a thickness of 800–1000 Å, and the dielectric layers 22 and 25 can be 1000 Å in thickness for one implementation of the storage medium.

Figure 3:
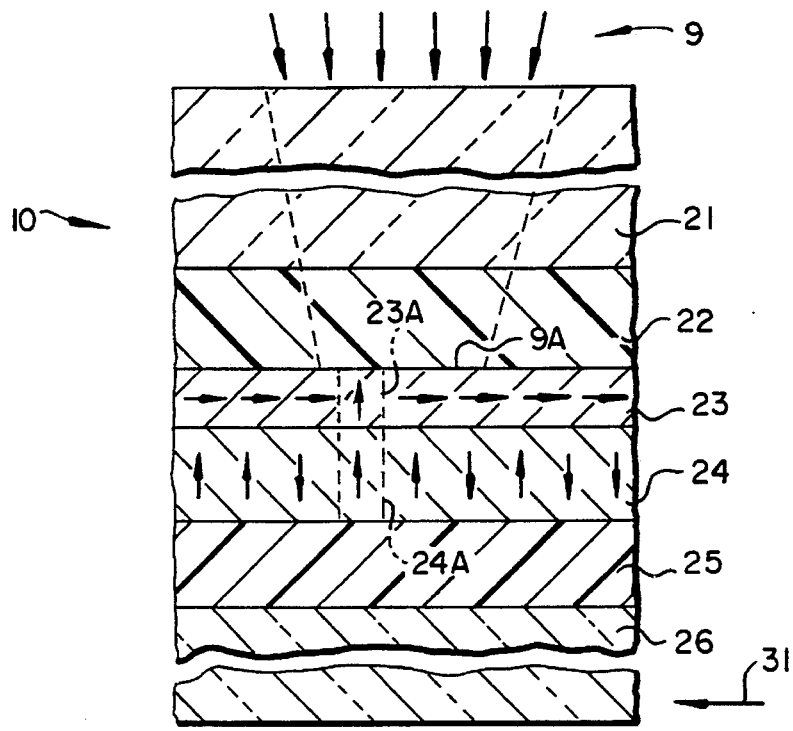
FIG. 3 is a phenomenological diagram of the operation of the magneto-optical storage medium according to the present invention.

Referring to FIG. 3, the effect of illumination of the storage medium 10 with radiation of appropriate intensity is shown. The storage medium is moving relative to the impinging radiation 9 in a direction indicated by arrow 31. The (focused) impinging radiation illuminates, after passing through the transparent support layer 21 and the dielectric layer 22, an area 9A on the surface of the read layer 22. When the radiation has sufficient intensity, portions of the read layer 23 will have a temperature above the read layer transition temperature. A magnetic ordering of the portion 23A of the read layer above the transition temperature will be caused by and will be parallel to magnetic ordering of the neighboring portion of the storage layer 24A through the exchange interaction.

Figure 4:
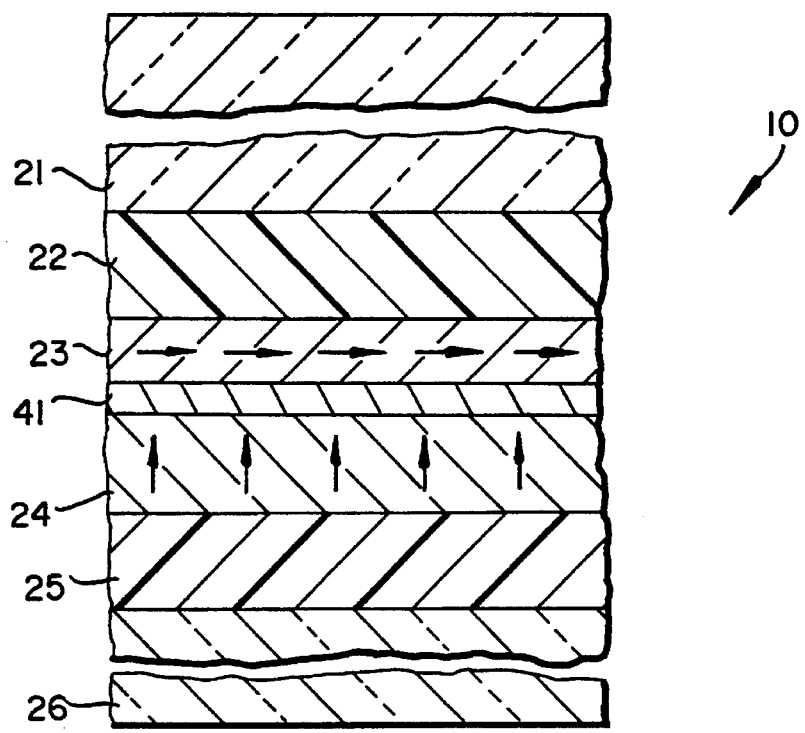
FIG. 4 is a cross-sectional diagram of a second embodiment of the storage medium according to the present embodiment.

Referring to FIG. 4, an enlarged cross section of a storage medium having a different structure is shown. The transparent support layer 21, the dielectric layer 22, the read layer 23, the storage layer 24, the second dielectric layer 25, and the protective layer 26 are present and have the same general relationship as shown in FIG. 2. In this implementation, however, a extra magnetic or magnetically polarizable layer 41 is present between the read layer 23 and the storage layer 24. This magnetic layer 41 is used to control the magnetic interaction between the read layer 23 and the storage layer 24. The magnetic layer 41 can be approximately 100 Å in thickness.

Figure 5:
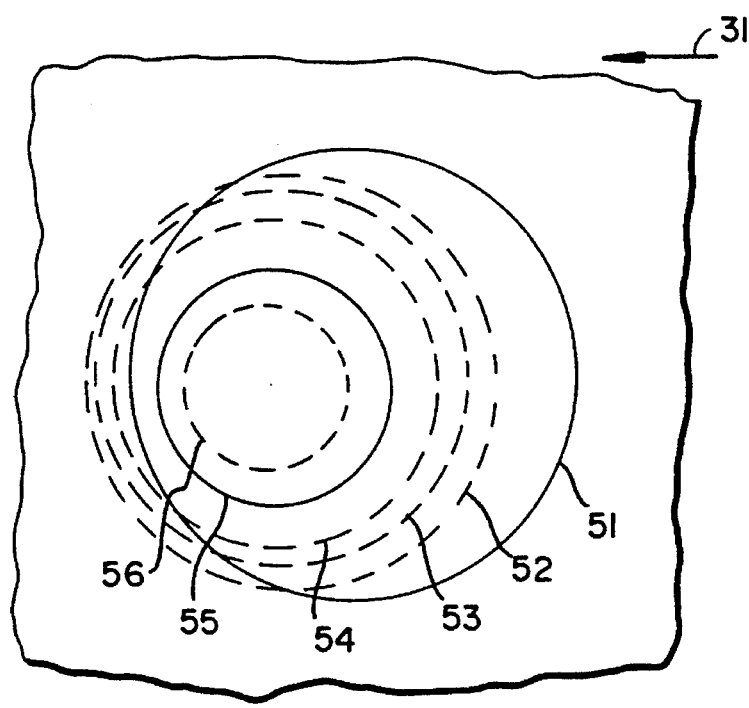
FIG. 5 is a top view of the storage medium illustrating the relationship of isotherms of the storage medium to the impinging radiation beam.

Referring to FIG. 5, an illustration of the area 9A of the read layer 23 which is illuminated by the focused radiation is shown as contour 51. Shown as contours 52 through 56 are the isothermal contours. The contour 55 is selected to designate the transition temperature of the read layer 23 and the region within the contour 55 is at a temperature above the transition temperature. The region of the read layer above the transition temperature has a magnetic orientation which is determined by the neighboring storage layer.

2. Operation of the Preferred Embodiment

The purpose of the invention is to provide a technique for reading data from a storage medium in which the data is stored with a density higher than can normally be retrieved from magneto-optical storage medium in the absence of an initializing field required in prior art devices for the read operation. Typically, any attempt to detect data, i.e., identify a magnetic orientation of region smaller than the illumination area of the impinging radiation beam, would have difficulty distinguishing between neighboring areas of magnetic orientation. In the present invention, however, only a portion of the area of illumination receives sufficient energy to raise the read layer material above the transition temperature. The read layer material is selected to have a rapidly decreasing longitudinal anisotropy as a function of temperature. These properties are typically provided by the crystalline anisotropy of uniaxial transition metal compounds, elements, superlattices and/or other materials having similar properties. The area of the storage material which is above the transition temperature is determined by the rapidity of movement of the area of illumination over the surface of the storage medium, the thermal capacity and conductivity parameters of the storage medium, and the intensity of the radiation beam. The portion of the read layer that is above the transition temperature will be the only portion of the illuminated area which is oriented parallel to the radiation. Therefore, only this portion of the illuminated area (and, in fact, of the storage surface) will provide a signal that can be interpreted by the read apparatus. Viewed in another manner, only a portion of the read layer illuminated by the radiation beam will have the orientation of the associated storage layer portion and only this portion of the storage medium will provide a signal which the read apparatus of the information storage system can interpret. Therefore, the area of illumination which is not above the transition temperature will not provide an information signal (i.e., to the read apparatus).

While the storage medium has been described in general terms, this medium is typically implemented using an optical disk. However, other implementations of the storage medium such as tape can advantageously use the present invention. It will further be clear that separate radiation beams can be used to heat the read layer and to provide the reflected radiation for identifying the magnetic orientation of the illuminated read layer.

It will be now appreciated that there has been presented a storage medium for which regions of magnetic orientation can be unambiguously identified, the regions of magnetic orientation being smaller than the area illuminated by the radiation read beam. The storage medium includes a storage layer in which oriented magnetic regions have a density which would complicate the identification of the orientation of the regions if the entire area illuminated by the radiation beam was involved in the stored signal detection. By appropriate choice of parameters of the storage medium of the present invention and the reading radiation beam, a higher density of regions of magnetic orientation can be unambiguously identified.

While the invention has been described with reference to storage media relying on the Kerr effect, it is apparent that the invention is easily adapted to other devices which can identify the magnetic orientation of small regions. Similarly, while the invention has been described with particular reference to a preferred embodiment both in the storage medium and in the magneto-optical system used in "reading" the storage medium, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A storage medium for use in a magneto-optical information storage system wherein a portion of said storage medium is illuminated by a read radiation beam causing a portion of the area under illumination to be heated from an operating temperature to a read temperature, said medium comprising:

a storage layer comprising a magnetic material having an axis of orientation generally perpendicular to a surface of said storage layer at the operating temperature; and a magnetic orientation either parallel or anti-parallel to the direction of impinging radiation, said magnetic orientation being a function of stored data; and wherein the storage layer retains the magnetic orientation at temperatures well above the read temperature; and a read layer parallel to said storage layer, and interacting magnetically with said storage layer, said read layer comprising a magnetic material having an axis of orientation generally parallel to a surface of said storage layer at the operating temperature, and having a transition temperature at which the axis of orientation of the magnetic domains of the read layer become perpendicular, and wherein said transition temperature is above said operating temperature but below said read temperature.

2. The storage medium of claim 1 further comprising a magnetic layer between said storage layer and said read layer wherein the magnetic layer controls the magnetic interaction between the read layer and the storage layer.

3. The storage medium of claim 1 further comprising:

a dielectric layer parallel to and proximate said read layer wherein the read layer exhibits a Kerr effect and the dielectric layer enhances the Kerr effect of the read layer; and a transparent substrate layer parallel to and proximate said dielectric layer where the substrate layer supports the dielectric layer, the storage layer and the read layer.

4. The storage medium of claim 3 further comprising:

a second dielectric layer parallel to and proximate said storage layer wherein the second dielectric layer protects the storage layer; and a layer of lacquer material parallel to and proximate said second dielectric layer wherein the lacquer material protects the second dielectric layer.

5. A storage medium according to claim 1 wherein the read layer is made of a material having an anisotropy energy in which the anisotropy energy associated with maintaining the parallel axis of orientation decreases rapidly as a function of temperature above the operating temperature, even to the extent that the read layer prefers a perpendicular axis of orientation at temperatures above operating temperatures.

6. A storage medium according to claim 1 wherein the radiation beam is a laser beam.

7. The read layer of claim 1 wherein the transition temperature of the read layer is within the range of temperatures observed in the read layer under the area of illumination such that only a portion of the read layer that is under illumination is above the transition temperature.

8. An optical storage system comprising:

a magneto-optical information storage system that reads information from a storage medium with a read radiation beam scanning said storage medium causing a portion of said medium under the area of illumination to be heated from an operating temperature to a read temperature, said medium comprising:

a storage layer comprising a magnetic material having an axis of orientation generally perpendicular to a surface of said storage layer at the operating temperature; and a magnetic orientation either parallel or anti-parallel to the direction of impinging radiation, said magnetic orientation being a function of stored data; and wherein the storage layer retains the magnetic orientation at temperatures well above the read temperature; and a read layer parallel to said storage layer, and interacting magnetically with said storage layer, said read layer comprising a magnetic material having an axis of orientation generally parallel to a surface of said storage layer at the operating temperature, and having a transition temperature at which the axis of orientation of the magnetic domains of the read layer become perpendicular, and wherein said transition temperature is above said operating temperature but below said read temperature; and optical information retrieval means, said retrieval means including apparatus for scanning the read radiation beam relative to said storage medium, said retrieval means responsive to interaction of said radiation beam with said read layer to detect the direction of magnetic orientation of the portion of the read layer under the area of illumination that has been heated above the transition temperature.

9. The optical storage system of claim 8 wherein the portion of the read layer that is heated above the transition temperature is smaller than the area under illumination.

* * * * *